US010857999B2

(12) United States Patent
Miyamoto

(10) Patent No.: US 10,857,999 B2
(45) Date of Patent: Dec. 8, 2020

(54) VEHICLE DEVICE

(71) Applicant: DENSO CORPORATION, Kariya (JP)

(72) Inventor: Yosuke Miyamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 149 days.

(21) Appl. No.: 16/083,705

(22) PCT Filed: Feb. 1, 2017

(86) PCT No.: PCT/JP2017/003503
§ 371 (c)(1),
(2) Date: Sep. 10, 2018

(87) PCT Pub. No.: WO2017/159092
PCT Pub. Date: Sep. 21, 2017

(65) Prior Publication Data
US 2019/0071077 A1 Mar. 7, 2019

(30) Foreign Application Priority Data

Mar. 18, 2016 (JP) .................. 2016-055970

(51) Int. Cl.
B60W 30/095 (2012.01)
B60W 30/16 (2020.01)
B60W 40/04 (2006.01)
G01S 15/93 (2020.01)
G01S 13/93 (2020.01)
(Continued)

(52) U.S. Cl.
CPC ...... B60W 30/0956 (2013.01); B60W 30/095 (2013.01); B60W 30/16 (2013.01); B60W 40/04 (2013.01); G01S 13/93 (2013.01); G01S 15/93 (2013.01); G08G 1/16 (2013.01);
(Continued)

(58) Field of Classification Search
CPC ....... B60W 2050/146; B60W 2554/00; B60W 30/095; B60W 30/0956; B60W 30/16; B60W 40/04; G01S 13/93; G01S 15/93; G08G 1/16; G08G 1/166
See application file for complete search history.

(56) References Cited

U.S. PATENT DOCUMENTS 5,339,075 A * 8/1994 Abst ............... B60Q 9/008
180/169
5,949,331 A * 9/1999 Schofield ............ B60N 2/002
340/461

(Continued)

FOREIGN PATENT DOCUMENTS

DE 102012206790 A1 10/2013
JP 2004-331023 A 11/2004
(Continued)

Primary Examiner — Babar Sarwar
(74) Attorney, Agent, or Firm — Maschoff Brennan

(57) ABSTRACT

A vehicle device applied to a vehicle is provided. The vehicle is equipped with obstacle sensors that, respectively, detect obstacles, the obstacle sensors have respective detection ranges spreading toward at least one of a right lateral side or a left lateral side of the vehicle, and the detection ranges are arranged in an anteroposterior direction of the vehicle. The vehicle device includes a determination unit configured to successively determine a movement state of one of the obstacles relative to the vehicle based on a transition of one of the obstacle sensors which detects the one of the obstacles.

11 Claims, 8 Drawing Sheets

(51) Int. Cl.
*G08G 1/16* (2006.01)
*B60W 50/14* (2020.01)

(52) U.S. Cl.
CPC ....... *G08G 1/166* (2013.01); *B60W 2050/146* (2013.01); *B60W 2554/00* (2020.02)

(56) References Cited

U.S. PATENT DOCUMENTS

| | | | | |
|---|---|---|---|---|
| 6,580,385 | B1 * | 6/2003 | Winner | G01S 13/865 |
| | | | | 342/70 |
| 6,618,672 | B2 * | 9/2003 | Sasaki | B60R 1/00 |
| | | | | 340/435 |
| 6,680,689 | B1 * | 1/2004 | Zoratti | B60Q 9/008 |
| | | | | 342/70 |
| 6,914,521 | B2 * | 7/2005 | Rothkop | B60Q 9/008 |
| | | | | 180/169 |
| 7,061,373 | B2 * | 6/2006 | Takahashi | G08G 1/166 |
| | | | | 340/435 |
| 7,289,019 | B1 * | 10/2007 | Kertes | B60Q 9/008 |
| | | | | 340/435 |
| 7,394,355 | B2 * | 7/2008 | Sjonell | G01S 7/4811 |
| | | | | 340/435 |
| 7,561,181 | B2 * | 7/2009 | Schofield | B60R 1/00 |
| | | | | 348/113 |
| 7,640,108 | B2 * | 12/2009 | Shimizu | B60K 35/00 |
| | | | | 701/301 |
| 8,493,195 | B2 * | 7/2013 | Lee | B60W 40/04 |
| | | | | 340/435 |
| 9,863,928 | B1 * | 1/2018 | Peterson | G08G 1/0141 |
| 2002/0183929 | A1 * | 12/2002 | Tsuji | G01S 11/12 |
| | | | | 701/301 |
| 2012/0277957 | A1 | 11/2012 | Inoue et al. | |
| 2013/0024103 | A1 | 1/2013 | Schneider | |
| 2017/0313297 | A1 * | 11/2017 | Okada | G08G 1/16 |

FOREIGN PATENT DOCUMENTS

| | | |
|---|---|---|
| JP | 2011-221673 A | 11/2011 |
| JP | 2013-020458 A | 1/2013 |
| JP | 2014-048205 A | 3/2014 |
| JP | 5449574 B2 | 3/2014 |
| JP | 2014-076689 A | 5/2014 |
| JP | 2014-078086 A | 5/2014 |
| WO | 2011/128940 A1 | 10/2011 |

* cited by examiner

VEHICLE DEVICE

CROSS REFERENCE TO RELATED APPLICATION

The present application is based on Japanese Patent Application No. 2016-55970 filed on Mar. 18, 2016, the disclosure of which is incorporated herein by reference.

TECHNICAL FIELD

The present disclosure relates to a vehicle device that determines a surrounding situation of a host vehicle.

BACKGROUND ART

Up to now, a technique in which an approach of an obstacle to a host vehicle is detected with the use of an obstacle sensor such as a radar device to perform a driving support has been known. For example, Patent Literature 1 discloses a technique for notifying an existence of another vehicle when any one of two distance measuring sensors for detecting an object on a lateral side of the host vehicle detects an entry of another vehicle with the use of a millimeter wave radar. The two sensors are disposed in a longitudinal direction of the host vehicle.

PRIOR ART LITERATURE

Patent Literature

Patent Literature 1: JP 5449574B

SUMMARY OF INVENTION

However, up to now, in the technique disclosed in Patent Literature 1, after another vehicle is detected and the notification is performed once, a change in a traveling state of another vehicle relative to the host vehicle is not newly determined and a support is not performed according to the change in the traveling state of another vehicle. Herein, the change in the travelling state of another vehicle relative to the host vehicle may include a case in which another vehicle catches up with the host vehicle and then travels in parallel to the host vehicle, a case in which another vehicle overtakes the host vehicle or the like.

An object of the present disclosure is to provide a vehicle device capable of performing a driving support according to a change in a traveling state of a moving object existing on a lateral side of a host vehicle.

According to an aspect of the present disclosure, a vehicle device applied to a vehicle is provided. The vehicle is equipped with obstacle sensors that, respectively, detect obstacles, the obstacle sensors have respective detection ranges spreading toward at least one of a right lateral side or a left lateral side of the vehicle, and the detection ranges are arranged in an anteroposterior direction of the vehicle. The vehicle device includes a determination unit configured to successively determine a movement state of one of the obstacles relative to the vehicle based on a transition of one of the obstacle sensors which detects the one of the obstacles.

In the above configuration, a transition manner of a target obstacle sensor among multiple obstacle sensors is different depending on a movement state of the obstacle relative to the host vehicle. The target obstacle sensor is an obstacle sensor which is activated to detect an obstacle. Detection ranges of the multiple obstacle sensors spread over at least one of right and left lateral sides of the vehicle, and the detection ranges are arranged in an anteroposterior direction of the vehicle. Therefore, a determination unit can successively determine the movement state of the obstacle existing on a lateral side of the host vehicle relative to the host vehicle based on the transition of the target obstacle sensor among the multiple obstacle sensors. When the movement state of the obstacle on the lateral side of the host vehicle can be successively determined, a change in the traveling state of the moving object on the lateral side of the host vehicle can be determined, and the driving support can be performed according to a change in the traveling state of the obstacle on the lateral side of the host vehicle.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Multiple embodiments and modifications will be described with reference to the drawings. For the sake of convenience of description, the same reference symbols are given to the parts having the same functions as those shown in the figures used for the description so far among the multiple embodiments and modifications, and description thereof may be omitted. The parts denoted by the same reference symbol can be referred to the description in other embodiments and/or modifications.

In addition, the following embodiments and modifications correspond to areas where traffic on the left side is legislated, and in areas where traffic on the right side is legislated, the right and left are opposite to those in the embodiments to be described below.

First Embodiment

<Schematic Configuration of Driving Support System 100>

Figure 1:
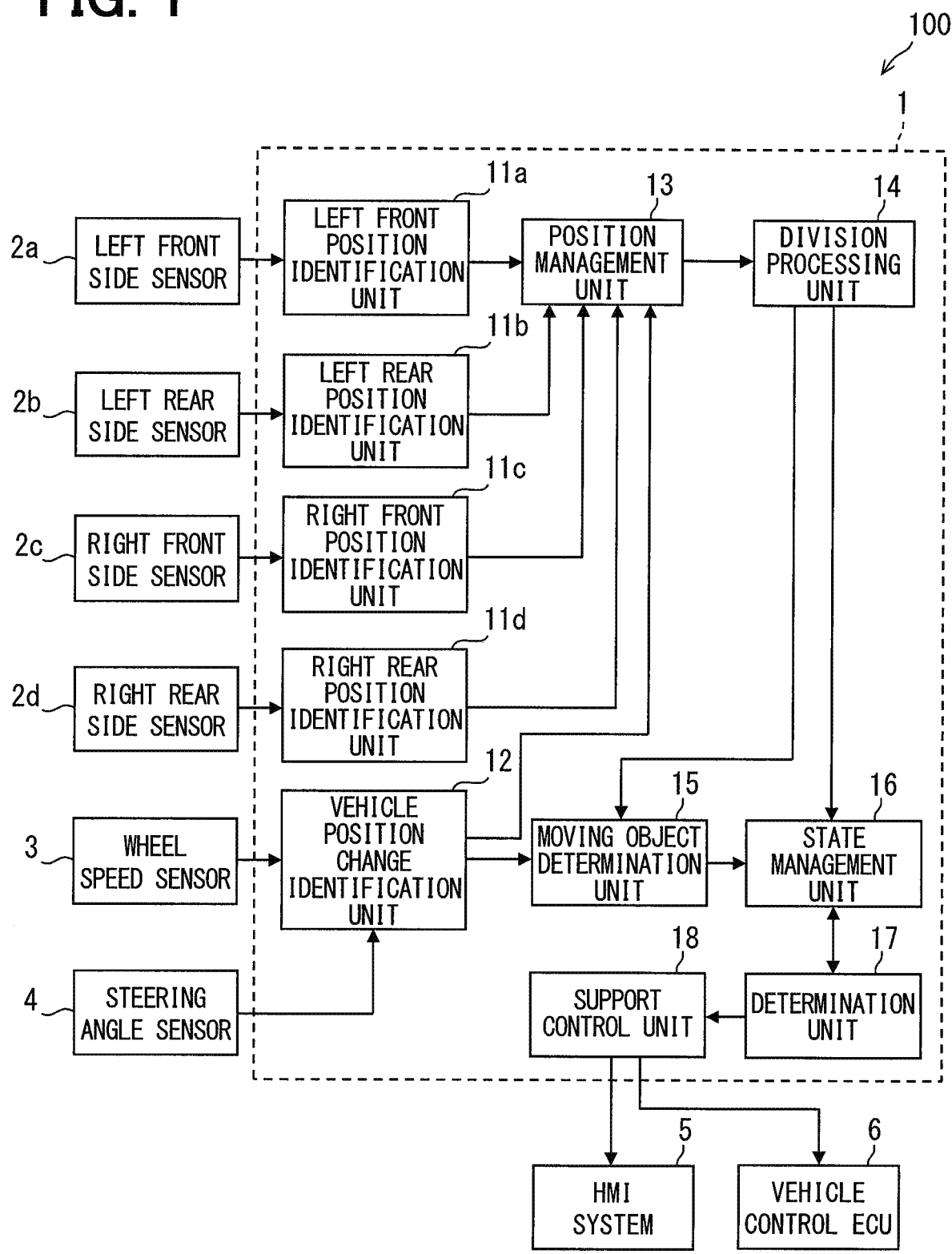
FIG. 1 is a diagram showing an example of a schematic configuration of a driving support system.

Hereinafter, a first embodiment will be described with reference to the drawings. A driving support system 100 shown in FIG. 1 is mounted in a vehicle and includes a driving support device 1, a left front side sensor 2a, a left rear side sensor 2b, a right front side sensor 2c, a right rear side sensor 2d, a wheel speed sensor 3, a steering angle sensor 4, an HMI system 5, and a vehicle control ECU 6. The vehicle equipped with the driving support system 100 is hereinafter referred to as a host vehicle.

The left front side sensor 2a, the left rear side sensor 2b, the right front side sensor 2c, and the right rear side sensor 2d will be described with reference to FIG. 2. The left front side sensor 2a is mounted on a left side surface of a front portion of the host vehicle (refer to HV in FIG. 2), and detects the obstacle existing on a left lateral side of the front portion of the host vehicle. The left rear side sensor 2b is mounted on a left side surface of a rear portion of the host vehicle and detects the obstacle existing on the left lateral side of the rear portion of the host vehicle. The right front side sensor 2c is mounted on a right side surface of the front portion of the host vehicle and detects the obstacle existing on the right lateral side of the front portion of the host vehicle. The right rear side sensor 2d is mounted on a right side surface of the rear portion of the host vehicle and detects the obstacle existing on the right lateral side of the rear portion of the host vehicle. The left front side sensor 2a, the left rear side sensor 2b, the right front side sensor 2c, and the right rear side sensor 2d correspond to obstacle sensors. Hereinafter, when there is no need to distinguish the left front side sensor 2a, the left rear side sensor 2b, the right front side sensor 2c, and the right rear side sensor 2d from each other, the sensors are referred to as side sensors 2.

Each side sensor 2 transmits a probe wave and receives a reflected wave of the probe wave reflected by an obstacle to detect a distance to the obstacle. Each side sensor 2 may be disposed so that a center line of directivity is, for example, parallel to an axle direction of the host vehicle. As an example, the side sensors 2 may be configured to start transmission of the probe waves when a shift position of the host vehicle is a traveling position other than a parking position or a neutral position. Alternatively, the side sensors 2 may be configured to start the transmission of the probe wave when an ignition power supply of the host vehicle is turned on.

Figure 2:
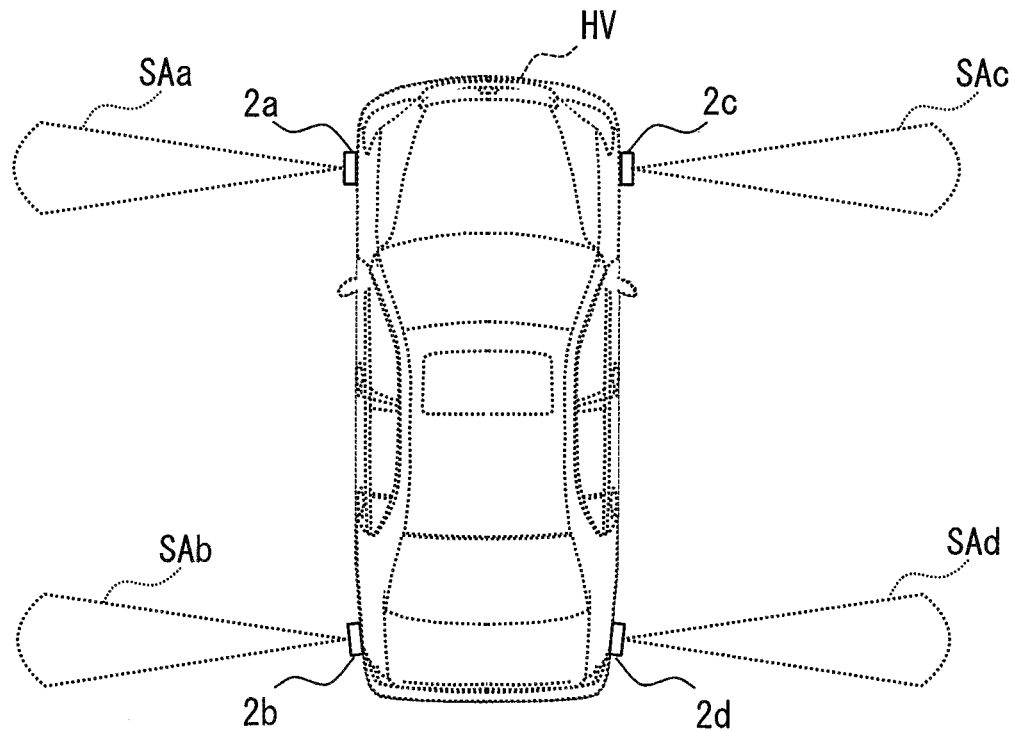
FIG. 2 is a diagram showing an example of installation positions and detection ranges of side sensors according to a first embodiment.

In an example of the present embodiment, as shown in FIG. 2, a detection range (refer to SAa in FIG. 2) of the left front side sensor 2a and a detection range (refer to SAb in FIG. 2) of the left rear side sensor 2b are arranged in the front and back on a left lateral side of the host vehicle in an anteroposterior direction of the host vehicle. On the other hand, a detection range (refer to SAc in FIG. 2) of the right front side sensor 2c and a detection range (refer to SAd in FIG. 2) of the right rear side sensor 2d are arranged in the front and back on a right lateral side of the host vehicle in an anteroposterior direction of the host vehicle.

The wheel speed sensor 3 successively outputs a pulse signal corresponding to a rotational speed of each rolling wheel. The steering angle sensor 4 is configured to detect a steering angle of a steering wheel of the host vehicle. The steering angle sensor 4 successively outputs, as a steering angle, a rotation angle relative to a neutral position. Herein, the neutral position (0 degrees) is defined as a position of the steering wheel when the host vehicle travels in a straight traveling state.

The HMI system 5 includes display devices such as a combination meter, a CID (center information display), and an HUD (head-up display), a sound output device such as audio speakers, an operation device, a control device such as an HCU (human machine interface control unit), and so on.

The combination meter is disposed in front of a driver's seat of the host vehicle. The CID is placed above a center cluster in a vehicle interior of the host vehicle. The combination meter and the CID display diverse images for information presentation on a display screen of the display based on image data acquired from the HCU. The HUD projects an image light based on the image data acquired from the HCU onto a projection region defined by a windshield of the host vehicle. The light of the image reflected by the windshield on the vehicle interior side is perceived by a driver seated in the driver's seat. The driver can visually recognize a virtual image of the image projected by the HUD in superposition with an outside scenery ahead of the host vehicle.

The audio speakers are placed in linings of doors of the host vehicle. The audio speakers present information to an occupant by reproducing a sound. The operation device is a switch group operated by the driver of the host vehicle. The operation device is used for performing various settings. For example, the operation device includes a steering switch equipped to a spoke portion of the steering wheel of the host vehicle, or the like.

The HCU includes a CPU, a memory such as a ROM and a RAM, an I/O, and a bus that connects those components to each other, and executes a control program stored in the memory to execute diverse processes. For example, the HCU controls the display device and/or a sound output device to indicate information. Some or all of functions to be executed by the HCU may be configured in hardware by one or more ICs or the like.

The vehicle control ECU 6 is an electronic control device that performs an acceleration and deceleration control and/or a steering control of the host vehicle. The vehicle control ECU 6 includes a steering ECU that performs a steering control, a power unit control ECU that performs the acceleration and deceleration control, a brake ECU, and the like. The vehicle control ECU 6 acquires detection signals output from respective sensors such as an accelerator position sensor, a brake pedal force sensor, a wheel speed sensor 3, a steering angle sensor 4, an acceleration sensor, and so on equipped to the host vehicle. Then, the vehicle control ECU 6 outputs control signals to the respective traveling control devices such as an electronic control throttle, a brake actuator, an EPS (electric power steering (EPS) motor, and the like.

The driving support device 1 includes a CPU, a memory such as a ROM and a RAM, an I/O, and a bus that connects those components to each other, and executes control programs stored in the memory to execute the diverse processes. The driving support device 1 executes the diverse processes based on various information input from the side sensor 2, the wheel speed sensor 3, the steering angle sensor 4, and the like. Meanwhile, a part or all of the functions to be executed by the driving support device 1 may be configured by one or multiple ICs or the like in a hardware manner. The driving support device 1 corresponds to a vehicle device.

The driving support device 1 determines an existence of a moving object on the lateral side of the host vehicle, and determines the movement state of the moving object based on the detection results of the side sensors 2. Herein, the moving object corresponds to the obstacle. In addition, the driving support device 1 performs a driving support such as the support of the driving operation performed by the driver and/or execution of driving operation instead of the driver, based on a detection result of a periphery monitoring sensor that detects the obstacle and/or the road surface marking in the vicinity of the host vehicle.

Examples of the support of the driving operation include a support for controlling the HMI system 5 to present information for notifying the driver of a direction in which the obstacle is present, and a support for controlling the HMI system 5 to perform a warning when the host vehicle moves to the direction in which the obstacle is present.

An example of execution of the driving operation instead of the driver includes a support for controlling the vehicle control ECU 6 to execute a self-driving function for automatically controlling the acceleration, braking and/or steering of the host vehicle. An example of the self-driving function includes an ACC (adaptive cruise control) that adjusts a driving force and a braking force based on the detection result of a preceding vehicle acquired from the periphery monitoring sensor, and controls a traveling speed of the host vehicle so as to maintain a target vehicle-to-vehicle distance to the preceding vehicle. Further, an example of the automatic driving function includes an LKA (lane keeping assist) function of generating a steering force in a direction of preventing the host vehicle from approaching a traveling lane marking. This LKA function is performed based on the detection result of the traveling lane marking, which is marked on the road surface in the traveling direction and acquired from the periphery monitoring sensor. The LKA function controls the host vehicle to maintain a traveling lane during a travelling. In addition, an example of the automatic driving function includes an LCA (lane change assist) function of automatically merging (in other words, lane change) the host vehicle to the adjacent lane based on the detection result of the traveling lane marking, which is marked on the road surface in the traveling direction and acquired from the periphery monitoring sensor, and the detection result of the moving object on the lateral side. It should be noted that what has been described above is only examples, and other functions may be provided as the self-driving function.

The periphery monitoring sensor includes the side sensors 2 as a sensor for monitoring the surroundings of the host vehicle. The periphery monitoring sensor includes a periphery monitoring camera for imaging a predetermined range around the host vehicle, a millimeter wave radar for transmitting a probe wave in a predetermined area around the host vehicle, a sonar, an LIDAR (light detection and ranging/laser imaging detection and ranging), and so on. The side sensors 2 may include any one of the periphery monitoring camera, the millimeter wave radar, the sonar, and the LIDAR. In the present embodiment, a case in which sonars are used as the side sensors 2 will be described as an example.

<Detailed Configuration of Driving Support Device 1>

As shown in FIG. 1, the driving support device 1 includes a left front position identification unit 11*a*, a left rear position identification unit 11*b*, a right front position identification unit 11*c*, a right rear position identification unit 11*d*, a vehicle position change identification unit 12, a position management unit 13, a division processing unit 14, a moving object determination unit 15, a state management unit 16, a determination unit 17, and a support control unit 18.

When the obstacle is detected by the left front side sensor 2*a*, the left front position identification unit 11*a* successively identifies a position (hereinafter, referred to as left first obstacle position) of the obstacle present on the left lateral side of the host vehicle relative to the host vehicle based on detection results successively obtained from the left front side sensor 2*a*. In more detail, the left front position identification unit 11*a* successively identifies a position of a reflection point of the obstacle relative to the host vehicle. The position of reflection point of the obstacle is a position at which the probe wave of the left front side sensor 2*a* is reflected.

As an example, the left front position identification unit 11*a* identifies the position of the reflection point according to a principle of triangulation with the use of a history of a distance from the left front side sensor 2*a* to the reflection point and a history of the position of the left front side sensor 2*a* similarly as disclosed in JP2014-78086A. A distance from the left front side sensor 2*a* to the reflection point may be calculated based on a duration elapsed from the transmission of the probe wave to the reception of the reflected wave. The position of the left front side sensor 2*a* may be calculated based on an installation position of the left front side sensor 2*a* relative to a position of the host vehicle position and the position of the host vehicle. The host vehicle position may be expressed as a position in an XY coordinate system with a reference point as an origin. For example, a rear wheel axle center position at a certain time point may be set as the reference point, that is, the origin of the XY coordinate system. The XY coordinate system may be obtained by taking an X-axis and a Y-axis on a horizontal plane. A reference point of the coordinate system is not limited to the center of the rear wheel axle, and may be set to a different point of the host vehicle.

Similarly to the left front position identification unit 11*a*, the left rear position identification unit 11*b* successively identifies, based on a detection result of the left rear side sensor 2*b*, a position (hereinafter referred to as a left second obstacle position) of the obstacle existing on the left lateral side of the host vehicle relative to the host vehicle. Similarly to the left front position identification unit 11*a*, the right front position identification unit 11*c* successively identifies, based on a detection result of the right front side sensor 2*c*, a position (hereinafter referred to as a right first obstacle position) of the obstacle existing on the right lateral side of the host vehicle relative to the host vehicle. Similarly to the left front position identification unit 11*a*, the right rear position identification unit 11*d* successively identifies, based on a detection result of the right rear side sensor 2*d*, a position (hereinafter referred to as a right second obstacle position) of the obstacle existing on the right lateral side of the host vehicle relative to the host vehicle. The left front position identification unit 11*a*, the left rear position identification unit 11*b*, the right front position identification unit 11*c*, and the right rear position identification unit 11*d* correspond to a position identification unit.

The vehicle position change identification unit 12 identifies a change in the position of the host vehicle according to the travel distance of the host vehicle. The travel distance of the host vehicle is obtained according to the pulse signal of the wheel speed sensor 3 and the change in the steering angle of the host vehicle successively detected by the steering angle sensor 4. The host vehicle position used for identifying the obstacle position in the left front position identification unit 11*a*, the left rear position identification unit 11*b*, the right front position identification unit 11*c*, and the right rear position identification unit 11*d* may be obtained by successively updating the position in the XY coordinate system described above according to a change in the host vehicle position identified by the vehicle position change identification unit 12.

The position management unit 13 stores the obstacle position identified by each of the multiple side sensors 2, for example, in a volatile memory of the driving support device 1, and updates the stored obstacle position according to a change of the position of the host vehicle caused by the traveling. As a specific example, the position management unit 13 successively updates the obstacle position in the XY coordinate system described above according to a change in the host vehicle position identified by the vehicle position change identification unit 12. In the division processing unit 14 to be described later, processing is performed with the use of the obstacle position stored in advance by the position management unit 13. The obstacle position is identified based on the detection result of each of the multiple side sensors 2.

The division processing unit 14 successively divides the left first obstacle positions in units of obstacles having different positions in a vehicle width direction based on a position difference of the left first obstacle positions successively identified by the left front position identification unit 11*a* in the vehicle width direction. As an example, the division processing unit 14 divides the left first obstacle positions whose position difference in the vehicle width direction is equal to or larger than a predetermined value into different obstacles. On the other hand, the division processing unit 14 divides the left first obstacle positions whose position difference in the vehicle width direction is smaller than the predetermined value into the same obstacle. The fact that the obstacle positions are divided into the different obstacles means that a target detected by the side sensors 2 is switched to another obstacle. In the present specification, "predetermined position" may be a position difference in the vehicle width direction which is hardly regarded as the same obstacle, and the predetermined position can be arbitrarily set.

Similarly to the left front position identification unit 11*a*, the division processing unit 14 also divides the left second obstacle position, the right first obstacle position, and the right second obstacle position in units of the obstacles having different positions in the vehicle width direction with respect to the left rear position identification unit 11*b*, the right front position identification unit 11*c*, and the right rear position identification unit 11*d*. Further, the division processing unit 14 may divide the left first obstacle position and the left second obstacle position, and the right first obstacle position and the right second obstacle position into the respective same obstacles when the position difference of those obstacle positions in the vehicle width direction is smaller than the predetermined value.

The left first obstacle position, the left second obstacle position, the right first obstacle position, and the right second obstacle position divided by the division processing unit 14 are stored into, for example, a volatile memory of the driving support device 1 in association with the respective divided obstacles. In that case, a time stamp indicating a time at which the obstacle position is identified may also be stored in association with the respective divided obstacles.

The moving object determination unit 15 determines whether the obstacle detected by the side sensors 2 is the moving object, or not, based on a difference between the deviation of the obstacle position identified for each of the multiple side sensors 2 and the deviation of the host vehicle position caused by traveling. In the following description, a case in which the host vehicle moves forward and the obstacle on the right lateral side of the host vehicle is detected will be exemplified.

When both of the right first obstacle position and the right second obstacle position have been identified for the obstacle currently being detected, which has been divided by the division processing unit 14, the moving object determination unit 15 determines whether the obstacle is the moving object, or not. As an example, the moving object determination unit 15 determines whether a deviation between the right first obstacle position identified when the obstacle is first detected by the right front side sensor 2*c* and the right second obstacle position identified when the obstacle is first detected by the right rear side sensor 2*d* coincides with a deviation corresponding to the change in the host vehicle position identified during the same period. The change in the host vehicle position is identified by the vehicle position change identification unit 12. In the present specification, the "coincide" is not limited to a perfect coincidence, and may include a coincidence with an allowable range of the degree of error. If it is determined as the coincidence, the obstacle currently being detected is determined as a stationary object. On the other hand, when it is determined as no coincidence, the obstacle currently being detected is determined as the moving object.

The state management unit 16 successively stores the detection state detected by the side sensors 2, the identified obstacle position, and the movement state of the obstacle determined by the determination unit 17 with respect to the obstacle determined as the moving object by the moving object determination unit 15. Information on the transition in the detection state of the side sensors 2 may be obtained from the division processing unit 14. For the moving object, when only the right first obstacle position is identified by the side sensors 2, the detection state is a state in which only the right front side sensor 2*c* detects the obstacle. On the other hand, when only the right second obstacle position is identified, the detection state is a state in which only the right rear side sensor 2*d* detects the obstacle. When both of the right first obstacle position and the right second obstacle position are identified, the detection state is a state in which both of the right front side sensor 2*c* and the right rear side sensor 2*d* detect the obstacle.

The determination unit 17 successively determines the movement state of the moving object relative to the host vehicle according to the information on the transition of the side sensor 2 that detects the moving obstacle, the identified obstacle position, and the history of the movement state of the obstacle determined by the determination unit 17, which are stored in the state management unit 16. The examples of the movement state include a catch-up state in which the moving object catches up with the host vehicle, a parallel traveling state in which the moving object travels parallel to the host vehicle, an overtaking state in which the moving object overtakes the host vehicle, a passing state in which the moving object passes the host vehicle in an opposite direction, and so on. The identified obstacle position and the history of the movement state of the obstacle determined by the determination unit 17 may be used, as necessary, corresponding to the movement state to be determined. Details of the determination of the movement state by the determination unit 17 will be described later.

The support control unit 18 gives an instruction to the HMI system 5 and/or the vehicle control ECU 6 based on the detection result of the periphery monitoring sensor that detects the obstacle and/or the road surface marking around the host vehicle to perform, for example, the driving support described above. Further, the support control unit 18 performs the driving support of the host vehicle based on the movement state of the moving object to be successively determined by the determination unit 17.

<Determination of Movement State>

Figure 3:
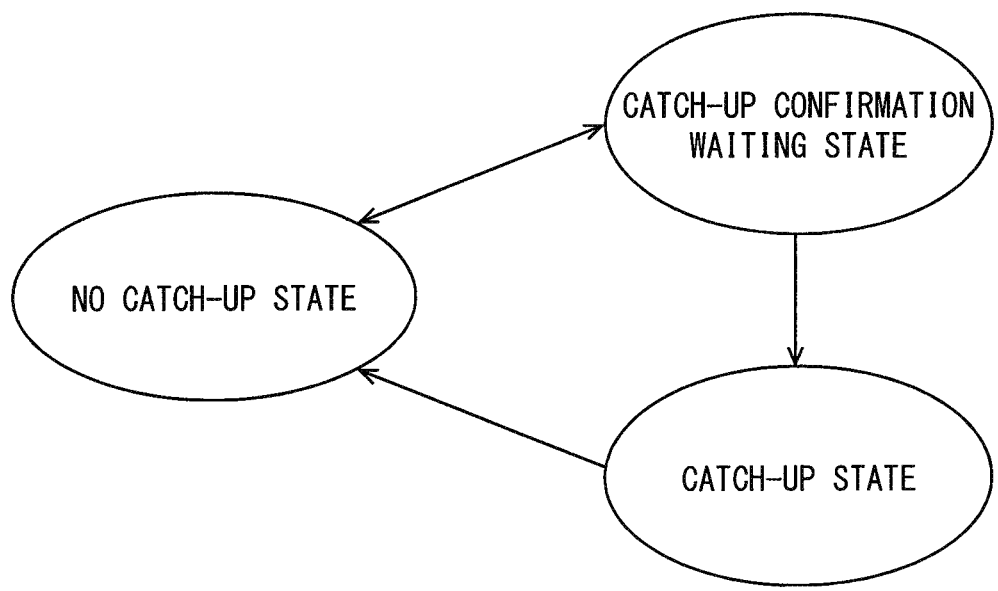
FIG. 3 is a diagram illustrating one example of a state transition of a movement state.
Figure 4:
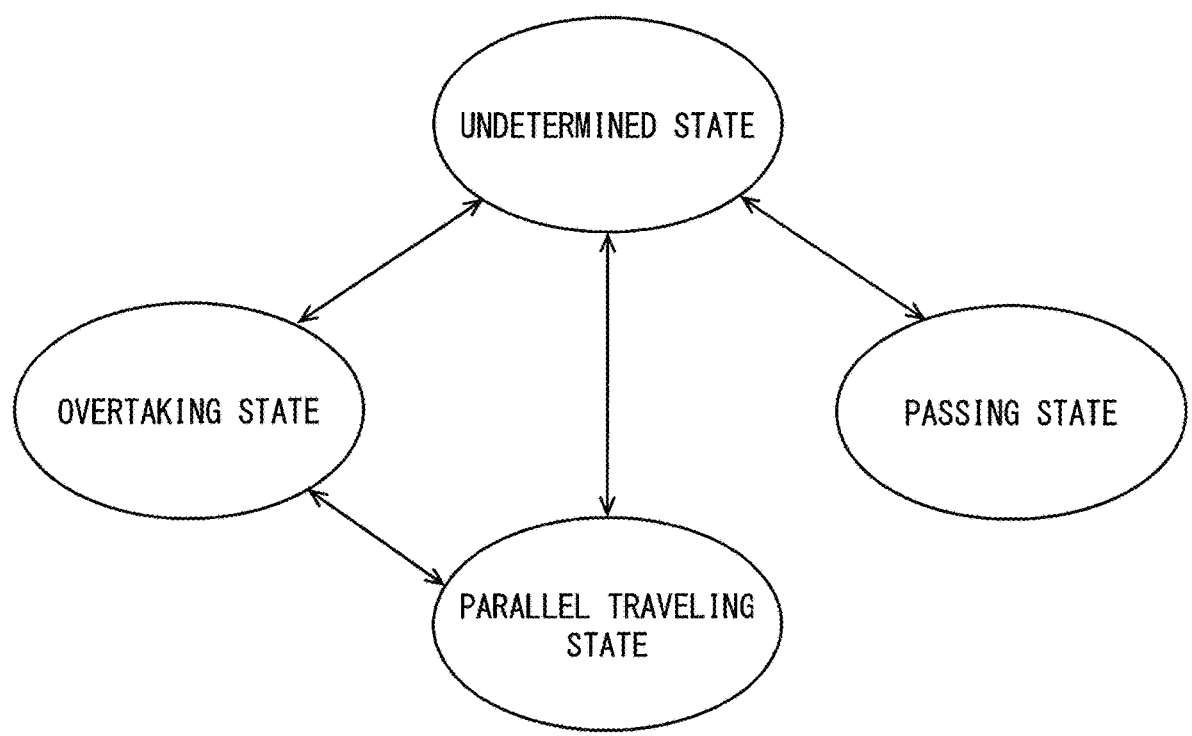
FIG. 4 is a diagram illustrating another example of the state transition of the movement state.

An example of determination of the movement state by the determination unit 17 will be described with reference to FIGS. 3 and 4. First, the determination of the catch-up state will be described with reference to FIG. 3.

[Catch-Up State]

A default state is a state of no catch-up in which no moving object is detected in both of the right front side sensor 2c and the right rear side sensor 2d. When the moving object is detected by the right rear side sensor 2d, the determination unit 17 determines that the obstacle is in a catch-up confirmation waiting state. Then, when a state in which the moving object is repeatedly detected by the right rear side sensor 2d continues, the determination unit 17 determines that the obstacle is in the catch-up state. On the other hand, when no moving object is detected by the right rear side sensor 2d, the determination unit 17 determines that the obstacle is in a state of no catch-up. When no moving object is detected by each of the right front side sensor 2c and the right rear side sensor 2d after determination as the catch-up state, the determination unit 17 determines that the obstacle is in the state of no catch-up. Alternatively, when the moving object is detected by the right rear side sensor 2d without going through the catch-up confirmation waiting state, the determination unit 17 may also determine that the obstacle is in the catch-up state.

[Parallel Traveling State, Overtaking State, Passing State]

Further, when the determination unit 17 determines that the obstacle is in the catch-up state, the determination unit 17 may further determine the movement state such as the parallel traveling state, the overtaking state, and the passing state. The parallel traveling state is a state in which the moving object travels in parallel with the host vehicle, the overtaking state is a state in which the moving object overtakes the host vehicle, and the passing state is a state in which the moving object passes the host vehicle in the direction opposite to the host vehicle. Now, the determination of the parallel traveling state, the overtaking state, and the passing state will be described with reference to FIG. 4.

The default state in the determination of the parallel traveling state, the overtaking state, and the passing state is an undetermined state. In the undetermined state after determining that the obstacle is in the catch-up state, suppose that a moving object (hereinafter referred to as a first moving object) is detected by the right rear side sensor 2d. In the undetermined state, suppose that the first moving object is also detected by the right front side sensor 2c. In this case, the determination unit 17 determines the movement state of the first moving object as the parallel traveling state.

On the other hand, in the undetermined state, when the right front side sensor 2c detects a different moving object (hereinafter referred to as a second moving object) at a position farther from the host vehicle than the first moving object detected by the right rear side sensor 2d in the vehicle width direction, the determination unit 17 determines the movement state of the second moving object as the passing state. Individual distinction may be performed according to the division of the obstacles by the division processing unit 14.

When there is no moving object to be compared, it is difficult to determine whether the movement state of the moving object detected by the right front side sensor 2c is the passing state or the overtaking state. On the other hand, according to the configuration of the first embodiment, since the moving object determined to be in the catch-up state is used as comparison reference, the passing state of the moving object highly likely to be an oncoming vehicle on an oncoming lane can be more easily determined.

In the undetermined state, when a moving object (hereinafter referred to as a third moving object) different from the first moving object detected by the right rear side sensor 2d is detected by the right front side sensor 2c and the third moving object is not detected by the right rear side sensor 2d, the determination unit 17 determines the movement state of the third moving object as the overtaking state.

In the undetermined state, when the moving object is detected by the right front side sensor 2c and the moving object is continuously detected after the detection and the moving object is not detected by the right rear side sensor 2d, the determination unit 17 determines the movement state of the moving object as the overtaking state.

In the parallel traveling state, when the first moving object is no more detected by the right rear side sensor 2d, the determination unit 17 determines the movement state of the first moving object as the overtaking state. When merely determining that the moving object is not detected by the right rear side sensor 2d, it is difficult to accurately determine the movement state of the moving object as the overtaking state. Therefore, in the first embodiment, a determination accuracy of the overtaking state is improved by determining that the obstacle is in the overtaking state under a condition that the obstacle has been in the parallel traveling state.

On the other hand, in the parallel traveling state, when the first moving object is detected by the right rear side sensor 2d, but the first moving object is not detected by the right front side sensor 2c, the determination unit 17 returns the movement state to the undetermined state. In that case, the determination unit 17 may determine that the movement state of the first moving object as the catch-up confirmation state.

Further, in the overtaking state, when a state in which the first moving object is detected by the right front side sensor 2c is ended, the determination unit 17 returns the movement state to the undetermined state. The end of state in which the first moving object is detected by the right front side sensor 2c is not limited to the state in which the obstacle is no longer detected by the right front side sensor 2c but also includes a current state changes to a state in which the obstacle other than the first moving object is detected by the front side sensor 2c. On the other hand, in the overtaking state, when the first moving object detected by only the right front side sensor 2c is also detected by the right rear side sensor 2d, the determination unit 17 returns the movement state of the first moving object to the parallel traveling state. This change in the movement state occurs when the first moving object attempts to overtake the host vehicle and then returns to parallel traveling after reconsideration.

In the passing state, if at least one of the right front side sensor 2c or the right rear side sensor 2d is in detection state of the second moving object, the determination unit 17 continues to determine the movement state of the second moving object as the passing state. Then, when each of the right front side sensor 2c and the right rear side sensor 2d no longer detects the first moving object and the second moving object, the determination unit 17 may return the movement state to the undetermined state.

<Movement State Determination Related Process>

Figure 5:
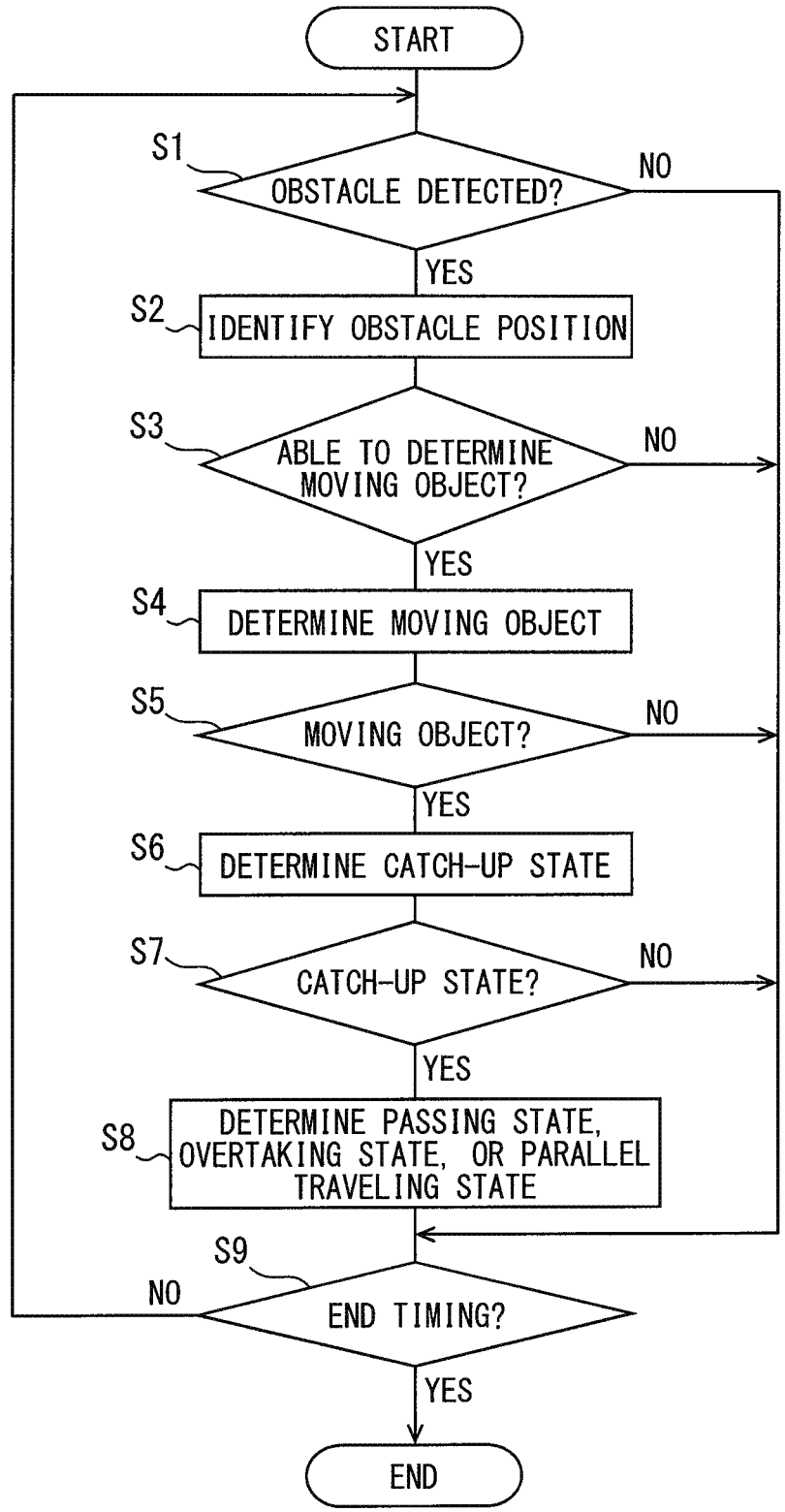
FIG. 5 is a flowchart showing an example of a flow of a movement state determination related process in a driving support device.

An example of the processing (hereinafter referred to as "movement state determination related process") related to the determination of the movement state in the driving support device 1 will be described with reference to a flowchart of FIG. 5. The flowchart of FIG. 5 may be configured to be started, for example, when the side sensors 2 are activated.

First, in Step S1, if the obstacle is detected by at least one of the right front side sensor 2c or the right rear side sensor 2d (yes in S1), the process proceeds to Step S2. On the other hand, if no obstacle is detected (no in S1), the process proceeds to Step S9.

In Step S2, when the obstacle is detected by the right front side sensor 2c, the right front position identification unit 11c successively identifies the right first obstacle position. When the obstacle is detected by the right rear side sensor 2d, the right rear position identification unit 11d successively identifies the right second obstacle position. Each identified obstacle position is divided corresponding to each obstacle based on the position difference of the obstacle positions in the vehicle width direction by the division processing unit 14.

Suppose that both of the right first obstacle position and the right second obstacle position of the currently detected obstacle divided by the division processing unit 14 have been specified. In this case, when the moving object determination unit 15 is capable of determining whether the obstacle is the moving object or not in Step S3 (yes in S3), the process proceeds to Step S4. On the other hand, suppose that one of the right first obstacle position or the right second obstacle position is not yet identified. In this case, the moving object determination unit 15 cannot determine whether the obstacle is the moving object or not (no in S3), and the process proceeds to Step S9.

In Step S4, the moving object determination unit 15 determines whether the obstacle currently being detected is the moving object or not. In Step S5, when the obstacle is determined as the moving object based on the determination process in S4 (yes in S5), the process proceeds to Step S6. On the other hand, in step S5, when the obstacle is determined as a stationary object based on the determination process in S4 (no in S5), the process proceeds to Step S9.

In Step S6, the determination unit 17 determines whether the obstacle determined to be the moving object is in the catch-up state or not. In Step S7, when it is determined based on the determination process of Step S6 that the moving object is in the catch-up state (yes in step S7), the process proceeds to Step S8. On the other hand, when it is determined based on the determination process of S6 that the moving object is not in the catch-up state (yes in S7), the process proceeds to Step S9.

In Step S8, the determination unit 17 determines whether the moving object is in the parallel traveling state, the overtaking state, or the passing state. The movement state of the moving object determined in S8 is used for driving support to be executed by the support control unit 18. The use of the movement state of the moving object for the driving support will be described in detail later.

In Step S9, when it is an end timing of the movement state determination related process (yes in Step S9), the movement state determination related process is terminated. On the other hand, when it is not the end timing of the movement state determination related process (no in step S9), the process returns to S1 to repeat the process. The end timing of the movement state determination related process may be set, for example, to a time when an ignition power supply of the host vehicle is turned off.

In the above description, the case in which the host vehicle moves forward and the obstacle on the right lateral side of the host vehicle is detected has been exemplified, but the present disclosure is not always limited to the above case. In the case where the host vehicle moves backward, the contents described above may be implemented by replacing the front and rear side sensors 2 of the host vehicle with each other. Whether the host vehicle moves forward or backward may be identified from a signal of the shift position sensor. In the case where the host vehicle moves backward, when different moving bodies are detected by the right front side sensor 2c at positions closer to the host vehicle than the moving object detected by the right rear side sensor 2d in the vehicle width direction in the undetermined state, the determination unit 17 may determine that the movement state of the different moving bodies is the passing state. Further, in the case of detecting the obstacle on the left lateral side of the host vehicle, the contents described above may be implemented by replacing the right and left side sensors 2 of the host vehicle with each other.

<Usage Example of Movement State of Moving Object in Driving Support>

Next, an example of use of the movement state of the moving object determined by the determination unit 17 in driving support will be described with reference to FIGS. 6 to 11. Symbol HV in FIG. 6 to FIG. 11 indicates the host vehicle, and OV indicates another vehicle. In examples of FIGS. 6 to 11, a case in which another vehicle OV travels on the right side of the host vehicle HV will be described.

[Determination of Vacant Space]

First, a description will be given of utilization of the movement state of the moving object in determination of a vacant space with reference to FIGS. 6 and 7. The determination result of the vacant space is used for generating a path at the time of driving support such as generation of a recommended path at the time of manual parking, generation of a parking path at the time of automatic parking, and generation of a traveling path at the time of self-driving.

Figure 6:
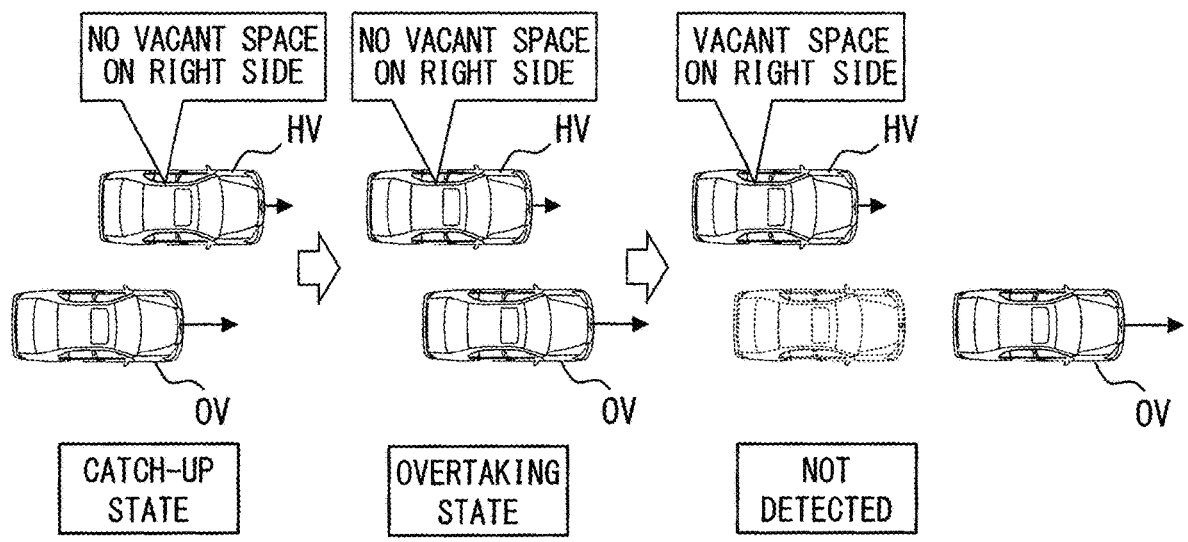
FIG. 6 is a diagram illustrating one example of use of the movement state of the moving object determined by a determination unit for a driving support.

FIG. 6 exemplifies a case in which another vehicle OV overtakes the right side of the host vehicle HV. In the example shown in FIG. 6, when the movement state of another vehicle OV determined by the determination unit 17 is the catch-up state, the support control unit 18 determines that there is no vacant space on the right side. Even when the movement state of another vehicle OV determined by the determination unit 17 transitions to the parallel traveling state or the overtaking state, the support control unit 18 determines that there is no vacant space on the right side. The support control unit 18 does not generate a path as the driving support in a region determined to have no vacant space.

On the other hand, after another vehicle OV has transitioned from the parallel travelling state to the overtaking state, when the movement state of another vehicle OV determined by the determination unit 17 transitions to an undetected state, the support control unit 18 determines that there is the vacant space on the right side. The support control unit 18 can generate a path as the driving support in a region determined to have the vacant space.

Figure 7:
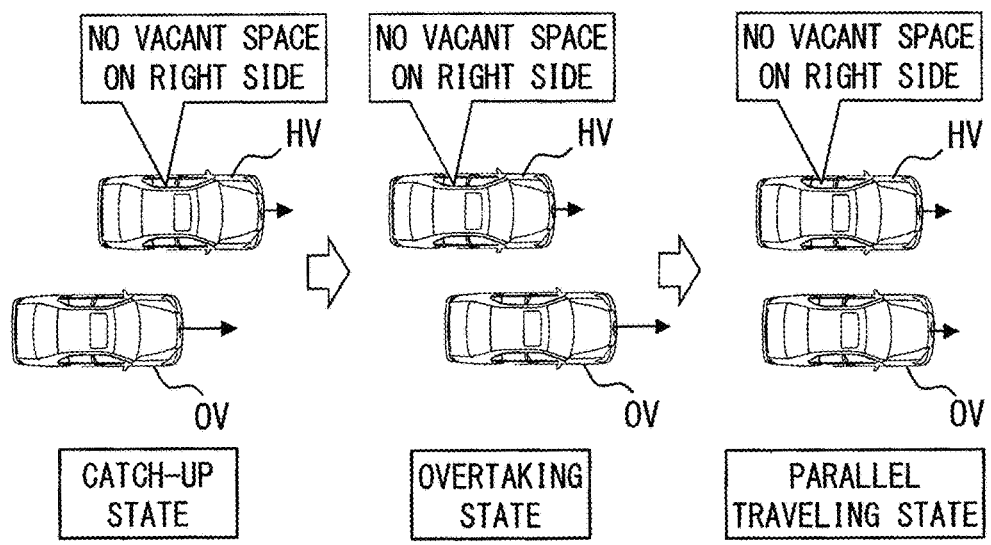
FIG. 7 is a diagram illustrating another example of use of the movement state of the moving object determined by the determination unit for the driving support.

FIG. 7 shows an example in which another vehicle OV attempts to overtake the right side of the host vehicle HV but stops overtaking and switches to parallel traveling. Even in the example shown in FIG. 7, as in the example shown in FIG. 6, when the movement state of another vehicle OV determined by the determination unit 17 is the catch-up state, the parallel traveling state, or the overtaking state, the support control unit 18 determines that there is no vacant space on the right side. Furthermore, even when the movement state of another vehicle OV determined by the determination unit 17 transitions from the overtaking state to the parallel traveling state, the support control unit 18 determines that there is no vacant space on the right side. As described above, the support control unit 18 does not generate a path as driving support in a region determined to have no vacant space.

As a result, after determining that another vehicle OV is in the overtaking state, the determination unit 17 newly determines whether another vehicle OV has actually overtaken the host vehicle or returned to the parallel traveling state. Thus, the support control unit 18 can generate the path as the driving support according to a change in the traveling state of another vehicle OV.

[Determination of Warning Necessity]

Figure 8:
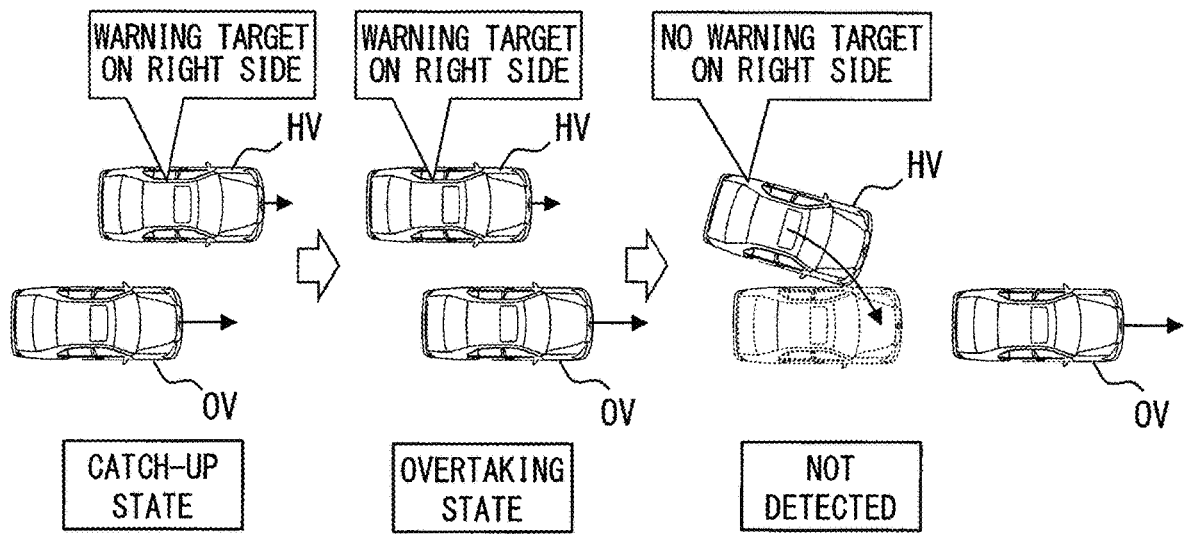
FIG. 8 is a diagram illustrating another example of use of the movement state of the moving object determined by the determination unit for the driving support.

Subsequently, a description will be given of utilization for determination of warning necessity with reference to FIGS. 8 and 9. The determination result of the warning necessity is used for driving support such as contact avoidance with obstacles. FIG. 8 shows a case in which another vehicle OV overtakes the right side of the host vehicle HV. In the example shown in FIG. 8, when the movement state of another vehicle OV determined by the determination unit 17 is the catch-up state, the support control unit 18 determines that there is a warning target on the right side. When the movement state of another vehicle OV determined by the determination unit 17 transitions to the parallel traveling state or the overtaking state, the support control unit 18 also determines that there is a warning target on the right side. When the host vehicle attempts to move to the region determined to have the warning target, the support control unit 18 instructs the HMI system 5 to issue a warning to the driver of the host vehicle from the display device and/or the sound output device.

On the other hand, after another vehicle OV has transitioned from the parallel travelling state to the overtaking state, when the movement state of another vehicle OV determined by the determination unit 17 transitions to the undetected state in which the other OV is not detected, the support control unit 18 determines there is no warning target on the right side. When the host vehicle attempts to move to the region determined to have no warning target, the support control unit 18 does not perform the warning described above.

Figure 9:
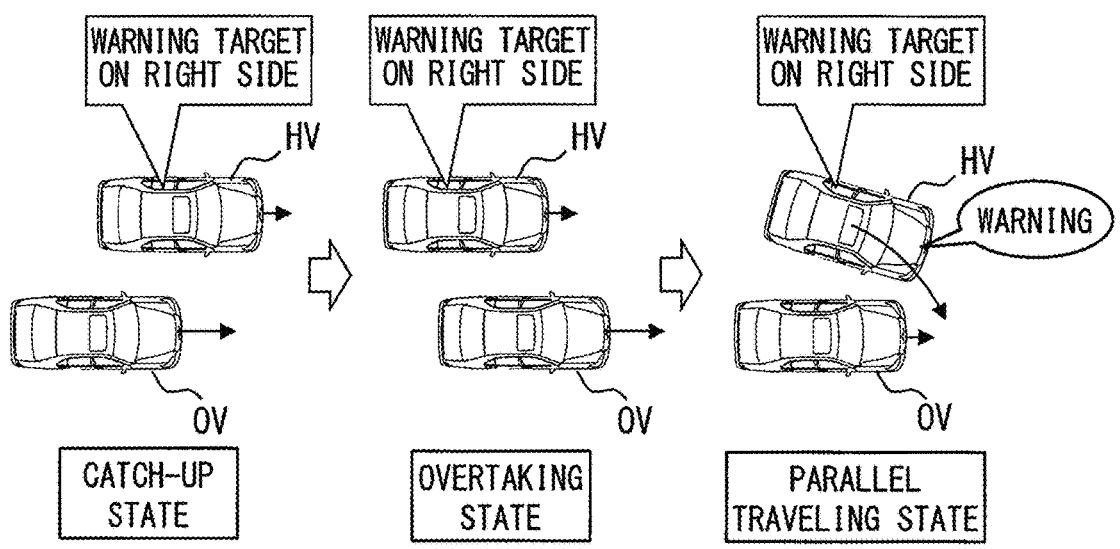
FIG. 9 is a diagram illustrating another example of use of the movement state of the moving object determined by the determination unit for the driving support.

FIG. 9 exemplifies a case in which another vehicle OV attempts to overtake the right side of the host vehicle HV but stops overtaking and switches to parallel traveling. Even in the example shown in FIG. 9, as in the example shown in FIG. 8, when the movement state of another vehicle OV determined by the determination unit 17 is the catch-up state, the parallel traveling state, or the overtaking state, the support control unit 18 determines that there is a warning target on the right side. Furthermore, even when the movement state of another vehicle OV determined by the determination unit 17 has transitioned from the overtaking state to the parallel traveling state, the support control unit 18 determines that there is a warning target on the right side. As described above, in the case where the host vehicle is about to move to the region determined to have the warning target, the support control unit 18 performs the warning described above.

Figure 10:
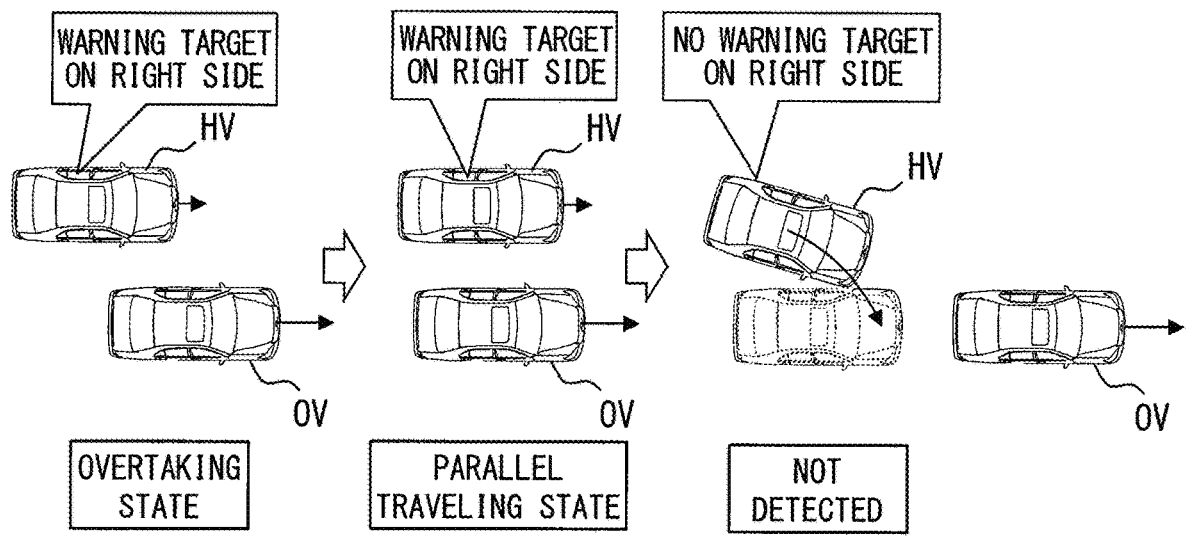
FIG. 10 is a diagram illustrating another example of use of the movement state of the moving object determined by the determination unit for the driving support.

FIG. 10 exemplifies a case in which after the host vehicle HV has caught up with another vehicle OV and has been in a parallel traveling state, another vehicle OV accelerates and overtakes the host vehicle HV. In the example shown in FIG. 10, when the movement state of another vehicle OV determined by the determination unit 17 is the overtaking state, the support control unit 18 determines that there is a warning target on the right side. Even when the movement state of another vehicle OV determined by the determination unit 17 transitions to the parallel traveling state, the support control unit 18 determines that there is a warning target on the right side. When the host vehicle attempts to move to the region determined to have the warning target, the support control unit 18 instructs the HMI system 5 to issue a warning to the driver of the host vehicle from the display device and/or the sound output device.

On the other hand, after another vehicle OV has transitioned from the parallel travelling state to the overtaking state, when the movement state of another vehicle OV determined by the determination unit 17 transitions to the undetected state in which the other OV is not detected, the support control unit 18 determines there is no vacant warning target on the right side. When the host vehicle attempts to move to the region determined to have no warning target, the support control unit 18 does not perform the warning described above.

As a result, after determining that another vehicle OV is in the overtaking state, the determination unit 17 newly determines whether another vehicle OV has actually overtaken the host vehicle or returned to the parallel traveling state. Thus, the support control unit 18 can issue a warning of collision avoidance according to a change in the traveling state of another vehicle OV.

In the above description, the warning is performed when the host vehicle intends to move to the region determined to have a warning target, but the present disclosure is not always limited to the above configuration. For example, when the host vehicle intends to move to the region determined to have the warning target, the driving support for limiting the movement to the area determined to have the warning target may be performed by automatic control of brake operation and/or steering operation.

[Determination of Mergeability]

Next, a description will be given of utilization of merge determination result that indicates whether merging to an adjacent lane is possible, with reference to FIGS. 11 and 12. The determination result of the mergeability is used for notifying a merging timing to the adjacent lane in a manual driving mode and determining a start of merging to the adjacent lane in an LCA function that automatically merging the host vehicle to the adjacent lane.

Figure 11:
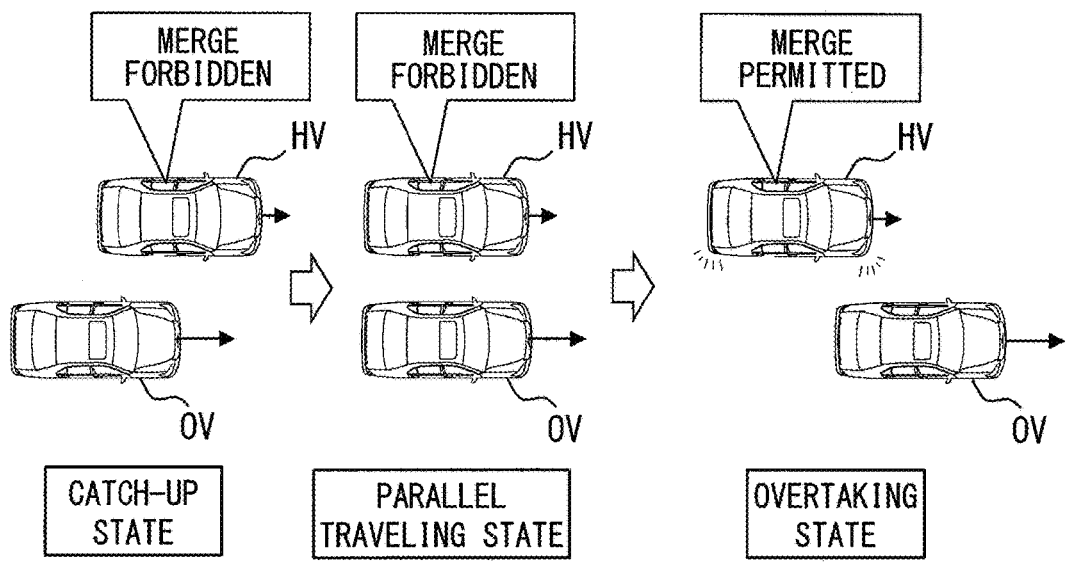
FIG. 11 is a diagram illustrating another example of use of the movement state of the moving object determined by the determination unit for the driving support.

FIG. 11 exemplifies a case in which another vehicle OV overtakes the right side of the host vehicle HV. In the example shown in FIG. 11, when the movement state of another vehicle OV determined by the determination unit 17 is the catch-up state or the parallel traveling state, the support control unit 18 determines that the merging is impossible. When it is determined that the merging is impossible, the support control unit 18 does not notify the merging timing to the adjacent lane or does not start the automatic merging. That is, the support control unit 18 does not permit the merging.

On the other hand, when the movement state of another vehicle OV determined by the determination unit 17 transitions from the parallel traveling state to the overtaking state, the support control unit 18 determines that the merging is possible. When it is determined that the merging is possible, the support control unit 18 notifies the merging timing to the adjacent lane, or turns on a blinker lamp of the host vehicle to start automatic merging. In other words, the support control unit 18 permits the merging.

Figure 12:
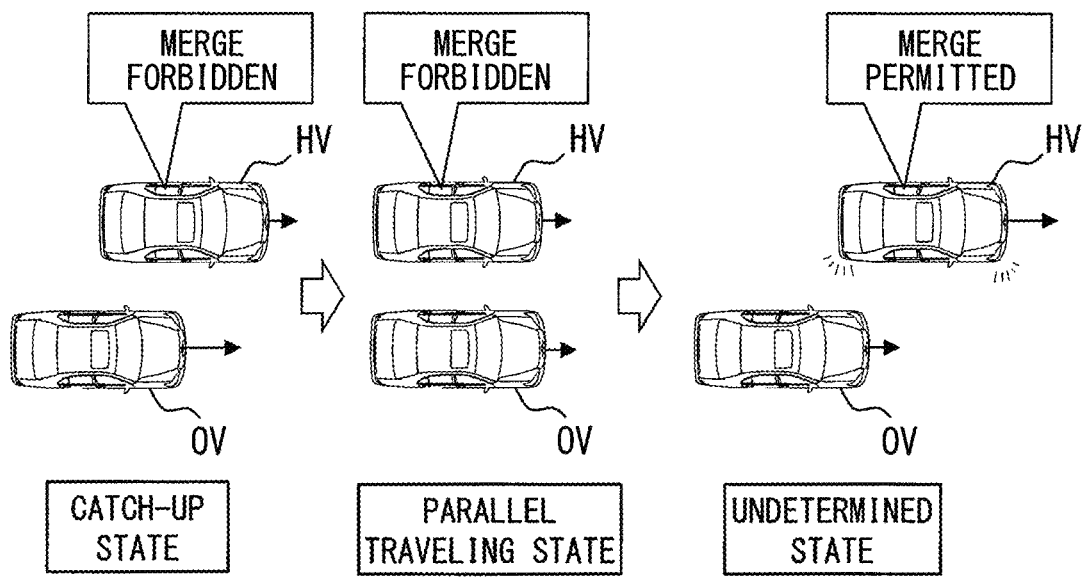
FIG. 12 is a diagram illustrating another example of use of the movement state of the moving object determined by the determination unit for the driving support.

FIG. 12 shows an example in which another vehicle OV attempts to overtake the right side of the host vehicle HV but stops overtaking and travels on the rear side of the host vehicle. In the example shown in FIG. 12, as with the example shown in FIG. 11, when the movement state of another vehicle OV determined by the determination unit 17 is the catch-up state or the parallel traveling state, the support control unit 18 determines that the merging is impossible. On the other hand, when the movement state of another vehicle OV determined by the determination unit 17 transitions from the overtaking state to the parallel traveling state or to the undetermined state, the support control unit 18 determines that the merging is possible. As described above, when it is determined that the merging is possible, the support control unit 18 notifies the timing of merging to the adjacent lane, or turns on a blinker lamp of the host vehicle and starts the automatic merging.

As a result, even a travelling tendency of another vehicle OV is not understood merely by an instantaneous movement state of another vehicle OV, thereby making it difficult to determine whether merging to the adjacent lane is possible or not, the support control unit 18 newly determines the movement state following the parallel traveling state. Thus, the support control unit 18 can support the merging to the adjacent lane according to a change in the traveling state of another vehicle OV.

Alternatively, when the moving object is not detected by the right front side sensor 2c after determining the overtaking state, notification of the merging timing to the adjacent lane may be performed, or the blinker lamp of the host vehicle may be turned on to automatically start the merging. In addition, when the moving object is not detected by the right rear side sensor 2d after transitioning from the parallel traveling state to the undetermined state, notification of the timing of merging to the adjacent lane may be performed, or the blinker lamp of the host vehicle may be turned on to automatically start the merging.

Overview of Embodiment

A manner of transition of an obstacle sensor that detects an obstacle among multiple side sensors 2 is different depending on a movement state of the obstacle relative to the host vehicle. Detection ranges of the multiple side sensors 2 are set to spread toward at least one of right and left lateral sides of the vehicle, and the detection ranges are arranged in an anteroposterior direction of the vehicle. For example, the order of the side sensors 2 that detect the obstacle is different depending on whether the obstacle approaches the host vehicle from the front or rear side of the host vehicle. In addition, the order of the side sensors 2 that no longer detect the obstacle is different depending on whether the obstacle moves away from the host vehicle on the front or rear side of the host vehicle. Besides, whether the obstacle continues to be detected by the obstacle sensors or not depends on whether the obstacle travels in parallel to the vehicle or travels away from the host vehicle.

According to the configuration of the first embodiment, the determination unit 17 successively determines the movement state of the obstacle existing on the lateral side of the host vehicle relative to the host vehicle on the basis of the transition of the side sensor 2 that detects the obstacle among the multiple side sensors 2. Therefore, the determination unit 17 can determine a change in the traveling state of the moving object on the lateral side of the host vehicle. In addition, as described above, the driving support can be performed according to a change in the traveling state of the moving object on the lateral side of the host vehicle.

Further, according to the configuration of the first embodiment, since the movement state is determined when the obstacle detected by the side sensors 2 is determined to be the moving object, a trouble of determining the movement state of the stationary object can be eliminated.

Second Embodiment

In the first embodiment, the two side sensors 2 whose detection ranges spreading toward at least one lateral side of the host vehicle are arranged in the anteroposterior direction of the host vehicle are used as the side sensors 2, but the present disclosure is not always limited to the above configuration. For example, three or more side sensors 2 whose detection ranges spreading toward at least one lateral side of the host vehicle are arranged in the anteroposterior direction of the host vehicle may be used as the side sensors 2 (hereinafter referred to as a second embodiment).

Figure 13:
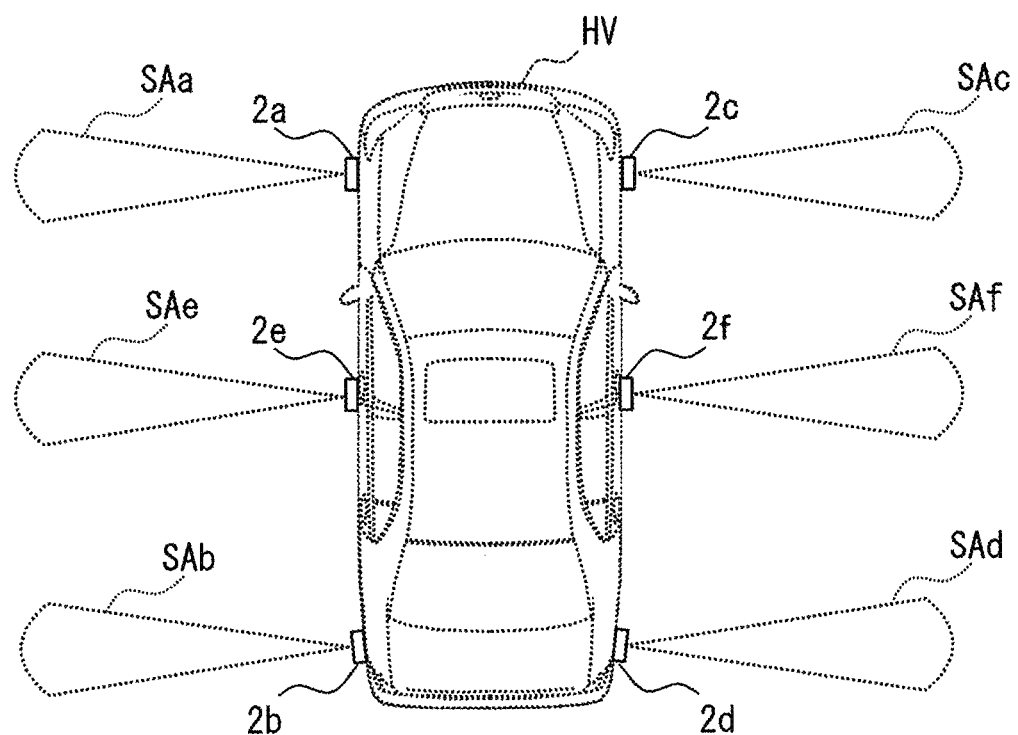
FIG. 13 is a diagram showing an example of installation positions and detection ranges of side sensors according to a second embodiment.

Hereinafter, an example of an installation position and a detection range of side sensors 2 according to the second embodiment will be described with reference to FIG. 13. In the example of FIG. 13, a case in which a left front side sensor 2a, a left center side sensor 2e, a left rear side sensor 2b, a right front side sensor 2c, a right center side sensor 2f, and a right rear side sensor 2d are mounted on a host vehicle will be exemplified.

The left center side sensor 2e is mounted on a left side surface of a center portion of the host vehicle (refer to HV in FIG. 12) and detects an obstacle existing on the left lateral side of the center portion of the host vehicle. The right center side sensor 2f is mounted on a right side surface of the center portion of the host vehicle and detects the obstacle existing on the right side of the center portion of the host vehicle. The left center side sensor 2e and the right center side sensor 2f also correspond to the obstacle sensors.

In addition, as shown in FIG. 13, a detection range (refer to SAa in FIG. 13) of the left front side sensor 2a, a detection range (refer to SAe in FIG. 13) of the left center side sensor 2e, and a detection range (refer to SAb in FIG. 13) of the left rear side sensor 2b are arranged in the front and back on a left lateral side of the host vehicle along an anteroposterior direction of the host vehicle. On the other hand, a detection range (refer to SAc in FIG. 13) of the right front side sensor 2c, a detection range (refer to SAf in FIG. 13) of the right center side sensor 2f, and a detection range (refer to SAd in FIG. 13) of the right rear side sensor 2d are arranged in the front and back on a right lateral side of the host vehicle along an anteroposterior direction of the host vehicle.

In the second embodiment, the driving support device 1 identifies the position of the obstacle detected by the left center side sensor 2e and the position of the obstacle detected by the right center side sensor 2f in the same manner as that of other side sensors 2. In the same manner as that in the first embodiment, the moving object determination unit 15 determines whether the obstacle detected by the side sensors 2 is the moving object or not, based on a difference between the deviation of the obstacle position identified for each of the multiple side sensors 2 and the deviation of the host vehicle position caused by traveling. For example, in the second embodiment, for the purpose of quickly starting the moving object determination, the moving object may be determined based on a difference between a deviation of the obstacle positions with respect to the side sensors 2 whose installation positions and/or detection ranges in the anteroposterior direction of the host vehicle come closer to each other and a deviation of the host vehicle position caused by traveling.

Further, in the second embodiment, the determination unit 17 determines the movement state of the moving object in more detail than that in the first embodiment with the use of information on a transition of the side sensors 2, which detect the obstacle determined as the moving object and are subdivided more than the side sensors 2 in the first embodiment. As an example, an overtaking state is determined in two stages according to the number of the side sensors 2 in which the moving object is not detected. As described above, according to the configuration of the second embodiment, the movement state of the moving object can be determined more precisely than that in the first embodiment.

(Modification 1)

In the embodiment described above, determination of the overtaking state is made on the condition that the obstacle has been in the parallel traveling state, but the present disclosure is not limited to the above configuration. For example, the overtaking state may be determined without any condition that the obstacle has been in the parallel traveling state.

(Modification 2)

In the embodiment described above, determination of the overtaking state, the passing state, and the parallel traveling state is made on the condition that the catch-up state has been determined, but the present disclosure is not limited to the above configuration. For example, the overtaking state, the passing state, and the parallel traveling state may be determined without any condition that the catch-up state has been determined.

(Modification 3)

In the embodiment described above, the movement state is determined when the obstacle detected by the side sensors 2 is determined to be a moving object, but the present disclosure is not limited to the above configuration. For example, the movement state of the obstacle may be determined without determining whether the obstacle detected by the side sensors 2 is the moving object or not.

(Modification 4)

In the embodiment described above, the side sensor 2 is attached to the side surface of the vehicle, but the present disclosure is not limited to the above configuration. Under a condition that the detection ranges of the side sensors 2 are arranged in the anteroposterior direction of the host vehicle on the same side in the vehicle width direction of the host vehicle and have the same orientations, the installation position is not limited to the side surface of the host vehicle.

(Modification 5)

In the embodiment described above, the change in the position of the host vehicle is identified according to the steering angle and the traveling distance of the host vehicle, but the present disclosure is not always limited to the above configuration. For example, the change in the position of the host vehicle may be identified with the use of a yaw rate or the like of the host vehicle.

(Modification 6)

In the embodiment described above, the support control unit 18 provided in the driving support device 1 performs the driving support, but the present disclosure is not limited to the above configuration. For example, the function of the support control unit 18 may be carried out by an electronic control device other than the driving support device 1.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

The invention claimed is:

1. A vehicle device including a processor and a non-transitory computer-readable storage medium, wherein the vehicle device is applied to a vehicle equipped with obstacle sensors that, respectively, detect obstacles, each of the obstacle sensors have detection ranges spreading toward at least one of a right lateral side or a left lateral side of the vehicle, and the detection ranges are arranged in an anteroposterior direction of the vehicle, the vehicle device comprising:

a determination unit configured to successively determine, using a processor, a movement state of one of the obstacles relative to the vehicle based on a transition of one of the obstacle sensors which detects the one of the obstacles;

a plurality of position identification units configured to identify, using the processor, positions of the obstacles detected, respectively, by the obstacle sensors relative to the vehicle for the obstacle sensors, respectively;

a moving object determination unit configured to determine, using the processor, for the obstacle sensors, respectively, whether the one of the obstacles detected by the one of the obstacle sensors is a moving object based on a difference between a deviation of the positions of the one of the obstacles identified by the corresponding position identification unit and a deviation of positions of the vehicle caused by a traveling of the vehicle; and a position management unit configured to store into the non-transitory computer-readable storage medium using the processor, for the obstacle sensors, respectively, the positions of the one of the obstacles identified by the corresponding position identification unit and update the positions of the one of the obstacles according to the deviation of the positions of the vehicle caused by the traveling of the vehicle, wherein the determination unit is configured to successively determine, using the processor, the movement state of the one of the obstacles relative to the vehicle based on the transition of the one of the obstacle sensors which detects the one of the obstacles determined as the moving object by the moving object determination unit, and the moving object determination unit is configured to determine, using the processor, whether the one of the obstacles detected by the one of the obstacle sensors is the moving object with reference to the positions of the one of the obstacles successively updated by the position management unit.

2. The vehicle device according to claim 1, wherein
the determination unit determines at least one of a passing state, an overtaking state, a catch-up state, or a parallel travelling state as the movement state,
in the passing state, the one of the obstacles passes through the vehicle in a direction opposite to a traveling direction of the vehicle,
in the overtaking state, the one of the obstacles overtakes the vehicle,
in the catch-up state, the one of the obstacles catches up with the vehicle, and
in the parallel traveling state, the one of the obstacles travels side by side with the vehicle.

3. The vehicle device according to claim 2, wherein
when the determination unit determines that the movement state is the catch-up state, the determination unit further determines whether the catch-up state is transitioned from the parallel travelling state, and
when the determination unit determines that the movement state is the overtaking state, the determination unit further determines whether the overtaking state is transitioned from the parallel travelling state.

4. The vehicle device according to claim 2, further comprising
a division processing unit configured to divide, using the processor, the positions of the obstacles in units of the obstacles that have different positions in a width direction of the vehicle based on a width-direction difference of the positions of the obstacles identified by the plurality of position identification units,
wherein
the obstacle sensors include a rear side sensor attached to a rear portion of the vehicle relative to the traveling direction of the vehicle and a front side sensor attached to a front portion of the vehicle relative to the traveling direction of the vehicle,
when a second moving object, which is detected by the front side sensor and is determined to be in the movement state by the moving object determination unit, is detected in
the width direction of the vehicle at a position farther from the vehicle than a first moving object, which is detected by the rear side sensor and is determined to be in the movement state by the moving object determination unit, the determination unit determines that the second moving object is in the passing state, and
when a third moving object, which is different from the first moving object and is determined to be in the movement state by the moving object determination unit, is detected by the front side sensor but not detected by the rear side sensor, the determination unit determines that the third moving object is in the overtaking state.

5. The vehicle device according to claim 2, further comprising:
a support control unit configured to perform, using the processor, a driving support of the vehicle based on the movement state to be successively determined by the determination unit.

6. The vehicle device according to claim 5, wherein
the determination unit determines whether the one of the obstacles is in the parallel traveling state, and
the support control unit, as the driving support, restricts a movement of the vehicle toward a lateral side of the vehicle where the one of the obstacles determined to be in the parallel traveling state is detected when the determination unit determines that the one of the obstacles is in the parallel traveling state.

7. The vehicle device according to claim 5, wherein
the determination unit determines whether the one of the obstacles is in the parallel traveling state or in the overtaking state,
the support control unit automatically merges the vehicle to an adjacent lane as the driving support,
when the determination unit determines that the one of the obstacles is in the parallel traveling state, the support control unit forbids the driving support which automatically merges the vehicle to the adjacent lane where the one of the obstacles determined to be in the parallel traveling state is detected, and
when the determination unit determines that the one of the obstacles is in the overtaking state after determining that the one of the obstacles is in the parallel traveling state, the support control unit permits the driving support which automatically merges the vehicle to the adjacent lane where the one of the obstacles determined to be in the overtaking state is detected.

8. The vehicle device according to claim 5, wherein
the determination unit determines whether the one of the obstacles is in the parallel traveling state or in the catch-up state,
the support control unit automatically merges the vehicle to an adjacent lane as the driving support,
when the determination unit determines that the one of the obstacles is in the parallel traveling state, the support control unit forbids the driving support which automatically merges the vehicle to the adjacent lane where the one of the obstacles determined to be in the parallel traveling state is detected, and
when the determination unit determines that the one of the obstacles is in the catch-up state after determining that the one of the obstacles is in the parallel traveling state, the support control unit permits the driving support which automatically merges the vehicle to the adjacent lane where the one of the obstacles determined to be in the catch-up state is detected.

9. The vehicle device according to claim 1, wherein
the obstacle sensors include two obstacle sensors, and
the detection ranges of the two obstacle sensors spread toward at least one of the right lateral side or the left lateral side of the vehicle and are arranged in the anteroposterior direction of the vehicle.

10. The vehicle device according to claim 1, wherein
the obstacle sensors include three or more obstacle sensors, and
the detection ranges of the three or more obstacle sensors spread toward at least one of the right lateral side or the left lateral side of the vehicle and are arranged in the anteroposterior direction of the vehicle.

11. A method for a vehicle to detect obstacles using a processor, a non-transitory computer-readable storage medium and obstacle sensors, each of the obstacle sensors having detection ranges spreading toward at least one of a right lateral side or a left lateral side of the vehicle, and the detection ranges being arranged in an anteroposterior direction of the vehicle, the method comprising:
successively determining a movement state of one of the obstacles relative to the vehicle based on a transition of one of the obstacle sensors which detects the one of the obstacles;
identifying positions of the obstacles detected, respectively, by the obstacle sensors relative to the vehicle for the obstacle sensors, respectively;

determining, for the obstacle sensors, respectively, whether the one of the obstacles detected by the one of the obstacle sensors is a moving object based on a difference between a deviation of the positions of the one of the obstacles identified and a deviation of positions of the vehicle caused by a traveling of the vehicle; and storing into the non-transitory computer-readable storage medium, for the obstacle sensors, respectively, the positions of the one of the obstacles identified and updating the positions of the one of the obstacles according to the deviation of the positions of the vehicle caused by the traveling of the vehicle, wherein successively determining the movement state of the one of the obstacles relative to the vehicle is based on the transition of the one of the obstacle sensors which detects the one of the obstacles determined as the moving object, and determining whether the one of the obstacles detected by the one of the obstacle sensors is the moving object is determined with reference to the positions of the one of the obstacles that are successively updated.

* * * * *